United States Patent [19]
Brajenovich

[11] 3,880,218
[45] Apr. 29, 1975

[54] ASYMMETRICAL CONSTRUCTION TIRE
[75] Inventor: Steve Brajenovich, Naperville, Ill.
[73] Assignee: The General Tire and Rubber Company, Akron, Ohio
[22] Filed: Mar. 29, 1974
[21] Appl. No.: 456,109

Related U.S. Application Data
[63] Continuation of Ser. No. 226,679, Feb. 16, 1972, abandoned.

[52] U.S. Cl............................ 152/209 R; 152/209 A
[51] Int. Cl............................................. B60c 11/00
[58] Field of Search........ 152/209 R, 209 D, 209 A, 152/330, 352, 353; 12/146-149

[56] References Cited
UNITED STATES PATENTS
| | | | |
|---|---|---|---|
| 166,522 | 4/1852 | Billingsley | 152/209 D |
| 2,534,869 | 12/1950 | Jones | 152/209 A |

Primary Examiner—Robert B. Reeves
Assistant Examiner—Larry H. Martin
Attorney, Agent, or Firm—Harry F. Pepper, Jr.

[57] ABSTRACT

An asymmetric construction tire has first and second circumferential shoulders and first and second circumferential tread portions. The first tread portion provides a substantially smooth and preferably slick tread pattern extending transversely from the first shoulder of the tire to adjoin the second tread portion near the peripheral centerline of the tire. The second tread portion transversely extends from the second shoulder of the tire and provides a tread pattern preferably comprising a plurality of transverse grooves. Preferably the grooves of the second tread portion are bifurcated adjacent the first tread portion, and are stepped, preferably adjacent the bifurcation, to be shallower adjacent the first tread portion and deeper adjacent the second shoulder of the tire.

2 Claims, 2 Drawing Figures

PATENTED APR 29 1975    3,880,218

ASYMMETRICAL CONSTRUCTION TIRE

This is a continuation of application Ser. No. 226,679 filed Feb. 16, 1972, now abandoned.

FIELD OF THE INVENTION

This invention relates to pneumatic tires and particularly construction tires used off the road for excavation equipment and other heavy machinery vehicles.

BACKGROUND OF THE INVENTION

Pneumatic tires are typically comprised of a tire carcass and a tread. The carcass has two or more layers usually of rubberized fabric or metal and provides the foundation structure for the tire. The carcass also has a pair of circumferential beads adapted to hold the tire on a rim of a wheel and pneumatically seal the tire with the wheel. The tread is integrated with the tire carcass and provides the ground-engaging surface of the tire. The tread is formulated usually from natural and/or synthetic rubber modified by the addition of oils, fillers, reinforcing agents, and processing aids such as accelerators and curing agents. A tread pattern is molded into the tread during the curing of the tire and serves to improve the performance characteristics of the tire.

The tread patterns are varied depending on the use of the tire. Substantially smooth treads, commonly called "slicks," are well known for wear resistance and traction on dry pavement. Tires for general use on motor vehicles usually have substantially fine tread patterns with circumferential grooves for traction on both dry and wet pavement and for lateral stability of the vehicle. Coarse tread patterns are also commonly used to provide traction for vehicles on ice and snow covered pavement.

Pneumatic tires with asymmetric tread patterns for motor vehicles and aircraft have long been known in the art. Exemplary are disclosures in U.S. Pat. Nos. 1,833,019, 2,130,524, 3,155,135, 3,217,776; 3,162,229, 3,286,756, 3,554,259 Des. 53,410, Des. 64,402 and Des. 166,522. The nature of the asymmetry varies with the intended use of the tire. Generally, the purpose has been to provide enhanced lateral stability and wear characteristics by utilizing the best patterns associated with each. This has meant that the tire is asymmetrically graduated with a coarse to fine pattern from the inboard to outboard shoulder of the tire. The adoption of the asymmetrical pattern has been limited to special on-road purposes. It has not been proposed to use a pattern incorporating a partly slick amd partly patterned tire for any purpose; nor has asymmetrical patterned tires been proposed to solve the unique problems encountered with off-the-road or construction tires.

Construction tires for heavy machinery are well known in the art. Typically the tread of such tires is a symmetrical, parallel pattern of coarse bars and coarse grooves extending transverse from near the peripheral centerline of the tread of the shoulders of the tire. This tread pattern provides for good transmission of high torque force to a bearing surface such as rough terrain, loose dirt and mud in the first instance, and keeps itself clean of mud and the like during use so that good transmission of forces to the bearing surface is maintained. Fine tread patterns and circumferential grooves are not needed to provide lateral guidance and stability because high speeds are not encountered with excavation equipment and the like. The problem with the tread patterns of construction tires is that they wear rapidly by virtue of cutting and tearing of the bars as well as other portions of the tread. It has been suggested that solid slick treads would remedy this wear problem, but the slick treads presents traction problems and substantially restricts the type of bearing surfaces on which the machinery vehicle can be used. For example, slick treads have little if any ability to provide traction in mud.

The present invention overcomes these difficulties and disadvantages. It provides an asymmetric tread for a construction tire with good traction and clean characteristics as well as superior wear characteristics.

SUMMARY OF THE INVENTION

A construction tire is comprised of a standard tire carcass providing the foundation and the fastening means for the tire, and an asymmetric tread mounted on said carcass and forming the ground-engaging surface for the tire. The tire carcass comprising several layers of tire cord material embedded in rubber may be made by any known means. The tread is formed by methods well known in the art using molds containing the negative of the tread pattern desired in the tread portion.

The tread has first and second circumferential shoulders, one of which when mounted is inboard of the machinery vehicle (i.e., facing inward of the vehicle) and the other of which when mounted is outboard of the machinery vehicle (i.e., facing outward of the vehicle). The tread also has first and second circumferential tread portions. First tread portion has a substantially smooth and preferably slick tread pattern and extends transversely from the first shoulder to adjoin said second tread portion near the peripheral centerline of the tire. Second tread portion extends transversely from the second shoulder of the tire and has a grooved tread pattern with coarse bars and coarse grooves extending transverse to the circumference of the tire.

Preferably, first and second tread portions adjoin substantially at the peripheral centerline of the tire, and the tire is mounted on the vehicle with the first shoulder outboard and the second shoulder inboard of the vehicle. The majority of the tread wear, e.g., chunking, ripping and slashing, of both the bars and groove bases has been found to occur on the outboard half of the tire. The first tread portion being the outboard half of the tread pattern provides a smooth and solid tread portion with no voids and in turn good cutting and tearing resistance, while the second tread portion being the inboard half of the tread pattern provides good traction with the bearing surface. The traction characteristics of the tire is therefore maintained while its wear characteristics and service life are substantially enhanced and extended.

Preferably, at least a plurality of grooves of the second tread portion are bifurcated adjacent the first tread portion. Construction tires are produced conventionally in a two-part mold which breaks along the peripheral centerline of the tire. The separating line or seam between the two parts often has a projecting ridge which upon use may cause the tire to tear at that point. This is generally due to inaccuracies in the molding operation causing the two halves of the mold not to properly mate. The danger of such tearing may cause rejection of the finished tire. The bifurcation of the grooves in the second tread portion impairs against tearing so that broader limits of quality control can be tolerated.

Moreover, the bifurcation of the grooves adjacent the first tread portion provides support for the tread at the seam between the first and second tread portions. The grooves in the second tread portion are relatively wide and relatively deep to develop good traction under adverse conditions; to aid in the self-cleaning of the tire; and to reduce the chances of cuts and tears in the base of the grooves. The bifurcation thus provides lateral support for the first tread portion at the seam with the second tread portion so that wear at the juncture is substantially reduced.

It is also preferred that at least a plurality of the grooves in the second tread portion be stepped, preferably adjacent the bifurcation, to be shallower adjacent the first tread portion and deeper adjacent the second shoulder of the tire. Additional lateral support for the first tread portion is thereby provided. Moreover, the step in the base of the groove is an aid to the self-cleaning of the tread.

Other details, objects and advantages of the invention will become apparent as the following description of a present preferred embodiment and a present preferred method of practicing the same proceeds.

BRIEF DESCRIPTION OF THE DRAWINGS

In the accompanying drawings, the present preferred embodiment of the invention and the present preferred method of practicing the invention is illustrated in which.

DESCRIPTION OF THE PREFERRED EMBODIMENT

Figure 1:
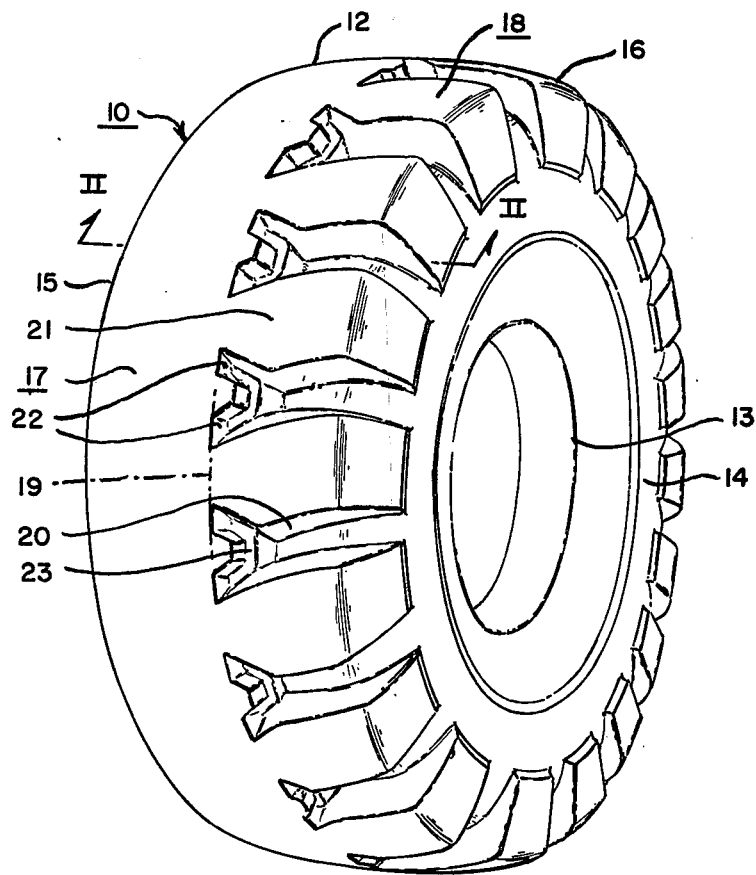
FIG. 1 is a perspective view of a construction tire for excavation equipment and the like having an asymmetric tread pattern.
Figure 2:
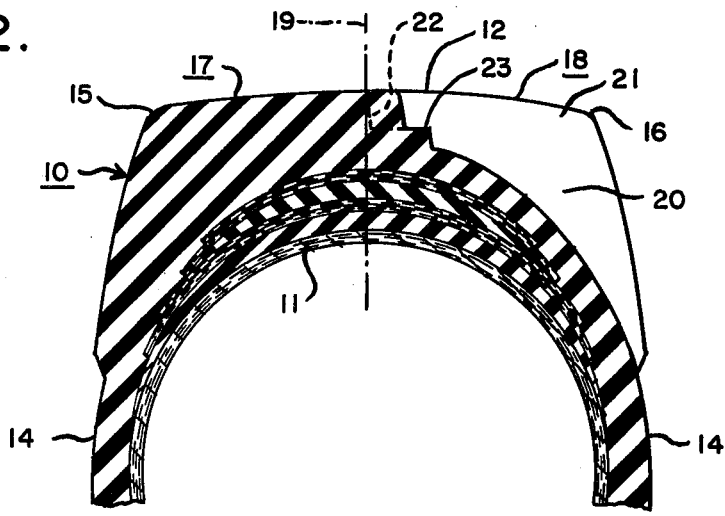
FIG. 2 is a fragmentary cross-sectional view taken along line II—II of FIG. 1.

Referring specifically to the drawings, construction tire 10 is made using conventional procedures and apparatus. Tire 10 has tire carcass 11 and tread 12. Tire carcass 11 contains several layers of tire cord material (i.e., fabric and/or metal) either of a conventional bias type or of the radial type, embedded in rubber. Tire carcass 11 provides the foundation for the tire. Tire carcass 11 also has circumferential beads 13 to mount the tire on a rim of a wheel and pneumatically seal the tire with the wheel.

Tread 12 of carbon black reinforced synthetic rubber is affixed to tire carcass 11 typically by chemical bonding during the cure of the tire. Tread 12 provides the ground-engaging surface for the tire. Tread 12 has sidewalls 14 and shoulders 15 and 16 circumferentially extending over tire carcass 11.

Tread 12 has first and second circumferential tread portions 17 and 18. First tread portion 17, having a substantially smooth, preferably slick tread surface, extends transversely from shoulder 15 to adjoin second tread portion 18 near the peripheral centerline 19 of the tire. Second tread portion 18, having a bar-grooved, coarse tread pattern extends transversely from shoulder 16. Grooves 20 of tread portion 18 are deep along most of their length and the bars 21 of tread portion 18 are very thick, thereby providing protection against cuts and bruises and insuring a long tread life as well as superior traction no matter how difficult the terrain.

The grooves 20 and bars 21 of tread portion 18 are so shown, preferably in parallely spaced array. It should be noted, however, that grooves 20 and bars 21 may extend transverse at an angle to the peripheral centerline 19 of the tire (not shown). Such angling of the grooves 19 and bars 20 aids in the self-cleaning of the grooves during operation.

As shown, the grooves 20 preferably have bifurcation 22 adjacent first tread portion 17 to laterally support first tread portion 17 and prevent tearing and cutting of the tread at the joint or seam between said first and second tread portions 17 and 18. Preferably, grooves 20 are also stepped at 23 so that the grooves are shallow adjacent first tread portion 17 and deep adjacent shoulder 16. This arrangement provides for lateral support of first tread portion 17 while aiding the self-cleaning of the tread to maintain good traction even under adverse conditions.

Preferably shoulder 15 is mounted so that it is outboard of the vehicle, i.e., facing outwardly of the vehicle; and shoulder 16 is mounted so that it is inboard of the vehicle, i.e., facing inwardly of the vehicle. In this way, first tread portion 17 is the outboard part of the tread where fatal cuts and bruises are mostly likely to be inflicted. First tread portion 17 is more resistant to wear than second tread portion 18 and in turn the service life of the tire 10 is extended. Meanwhile, the bar-grooved, coarse pattern of second tread portion 18 provides for efficient transmission of high torque loads to the bearing surface regardless of condition, e.g., soft earth, rock, sand, mud or snow.

The resulting construction tire 10 is good for a variety of uses. It can be used for concrete mixers, mining machinery, earthmoving and logging equipment, and most road building equipment as well as a variety of other heavy machinery vehicles where rocks, stumps, ruts, and other hazards which punish tires are encountered. It is specifically recommended for use on loader-dozer vehicles in rock-handling and load-fill operations. Construction tires for such use have been made which weigh 2,000 pounds, are approximately 7 feet in diameter, and have a load-carrying capacity of 37,410 pounds at 5 miles per hour.

While the presently preferred embodiments of the invention and methods for making them have been specifically described, it is distinctly understood that the invention may be otherwise variously embodied and used within the scope of the following claims.

What is claimed is:

1. In a tire for heavy machinery vehicles, an asymmetric tread defined by first and second shoulders axially spaced from the peripheral centerline of said tread, said tread comprising:
   A. first circumferential tread portion having a smooth surface extending transversely from said first shoulder to said peripheral centerline and
   B. a second circumferential tread portion having a non-smooth surface extending transversely from said second shoulder to said peripheral centerline and adjoining said first tread portion substantially along said peripheral centerline, said non-smooth surface comprising wide, circumferentially spaced, substantially mutually parallel grooves extending from said second shoulder to said peripheral centerline, each of said grooves varying in depth from shallow adjacent said peripheral centerline to deep adjacent said second shoulder.

2. The tire as defined in claim 1 wherein each of a plurality of said grooves of said second tread portion is bifurcated adjacent said peripheral centerline.

* * * * *